United States Patent [19]

Whitmore

[11] 4,205,743
[45] Jun. 3, 1980

[54] CONVEYOR FEEDER FOR CANDY EGGS

[76] Inventor: Henry B. Whitmore, Rt. 5, Box 369, San Antonio, Tex. 78211

[21] Appl. No.: 909,787

[22] Filed: May 26, 1978

[51] Int. Cl.² .............................................. B65G 47/14
[52] U.S. Cl. ...................................... 198/393; 221/162
[58] Field of Search ....................... 198/392, 393, 443; 221/160, 162, 171, 173; 198/803, 397, 399, 400

[56] References Cited

U.S. PATENT DOCUMENTS

| | | | |
|---|---|---|---|
| 1,074,869 | 10/1913 | Keast | 198/803 X |
| 2,777,561 | 1/1957 | Rose | 198/393 |
| 3,015,378 | 1/1962 | Thurlings | 198/393 |
| 3,817,423 | 6/1974 | McKnight | 198/392 |

Primary Examiner—Bruce H. Stoner, Jr.
Assistant Examiner—Douglas D. Watts
Attorney, Agent, or Firm—Gunn & Lee

[57] ABSTRACT

A conveyor feeder for positioning and loading candy eggs on a chain link conveyor. The feeder receives candy eggs from a controlled feed chute, a cone member distributes the eggs radially in a cylindrical hopper onto a counter-rotating ring. Rotating brushes assist in positioning the eggs in the circular receptacles in the ring. A conveyor chute facilitates the dropping of the eggs onto the chain link conveyor having spaced separating pins defining compartments for receiving a single candy egg. The conveyor feeder is suitable for positioning candy eggs on a chain link conveyor feeding automatic wrapping machine.

8 Claims, 5 Drawing Figures

CONVEYOR FEEDER FOR CANDY EGGS

BACKGROUND OF THE INVENTION

1. Field of the Invention

This invention comprises a device for receiving oblong items such as candy Easter eggs for positioning and feeding the Easter eggs or the like to a chain link or belt-like conveyor. The conveyor is visualized as a device for supplying the items to a wrapping machine or other type packaging device.

2. Description of the Prior Art

Sorters or feeders are previously known to the art. Related devices have been developed and patented which were developed for utilization in the pharmaceutical fields, such as handlers for pills or capsules. Devices operating in a similar fashion have been perfected and patented for handling candies. Among the most relevant patents known to exist, to the best of the knowledge of your applicant, are the patents to Thorlings, U.S. Pat. No. 3,015,378; Sterling, U.S. Pat. No. 3,635,325; Wagers, U.S. Pat. No. 3,838,766; and Sterling, U.S. Pat. No. 3,910,407. The structure of this invention appears to possess advantages and combination of structural elements not heretofore known in the art.

Of the prior art patents, perhaps the most similar are the patent to Thorlings which employs a rotating cone having pockets for receiving candy pieces at its outer edge. Wagers, pertaining to "capsule inspection apparatus and method," discloses a link conveyor with compartments conveying the capsules and a brush in contact with the items being conveyed. Sterling discloses a rotating circular member with pockets at its outer extremity for receiving items to be positioned and conveyed. The other patents cited are primarily as a matter of interest to indicate the state of the art. Your applicant's invention contains components and arrangements not present in the art to the best of the knowledge of your applicant; specifically, the device of this invention incorporates a cone member for rotating in a first direction, a ring member rotating in a second direction in combination with rotating brushes adjacent to ring member and receptacles in the ring members. The elements of a counter-rotating cone and ring with pockets or receptacles in the ring and brush assure that the oblong candy eggs are placed one at a time on end for passage down a chute to the conveyor. This combination appears to be a new arrangement in the art. Other components are present in the combination which will be claimed in the more detailed dependent claims.

SUMMARY OF THE INVENTION

The conveyor feeder is designed for receiving candy eggs from a feed chute having a supply source. The feed chute drops the eggs onto a cone rotating in a counterclockwise direction. At the lower edge or periphery of the cone, there is positioned a counter-rotating ring having a series of circular pockets or holes deeper than across, to assure that the objects stand on end. The cone and ring are surrounded by a cylindrical hopper which retains the items to be sorted on a rotating cone and ring. A multiplicity of rotating brushes are positioned adjacent the ring to facilitate gentle agitation of the candy eggs or other items being positioned in the circular receptacles in the ring for passing the items to the link chain conveyor. A conveyor chute receives the candy eggs from the ring and positions the eggs in the compartments on the chain link conveyor. A geared drive means is positioned on the support frame of the device constructed and arranged to rotate the cone in a counterclockwise direction while rotating the ring in a clockwise direction. This series of gears and shafts interconnect the chain link conveyor with a cone and ring to precisely coordinate the passage of the circular receptacles in the ring with the compartments formed by the pin in the chain link conveyor. This precise coordination is necessary in obtaining maximum efficiency of the wrapping machine which receives the items being passed from the conveyor feeder to wrapping machine which is not considered a component of this invention.

In the design and operation of feeder conveyors for oblong and oval objects difficulties in positioning the objects are frequently encountered. Difficulties also occur in more than one object being placed in one receptacle. The machine of this invention was designed to sort, position and feed candy Easter eggs to a conveyor for feeding a wrapping machine.

One of the objects of the invention was to place one item consistently in one receptacle of a chain link conveyor.

Another object was to position an elongated object on end and to feed and place the item in a desired position in a receptacle of a chain link conveyor.

BRIEF DESCRIPTION OF THE DRAWINGS

For a detailed description of the preferred embodiment, reference is made to the attached several views wherein identical reference characters will be employed to refer to identical or equivalent components throughout the several views and the following detailed description.

DESCRIPTION OF THE PREFERRED EMBODIMENT

Figure 1:
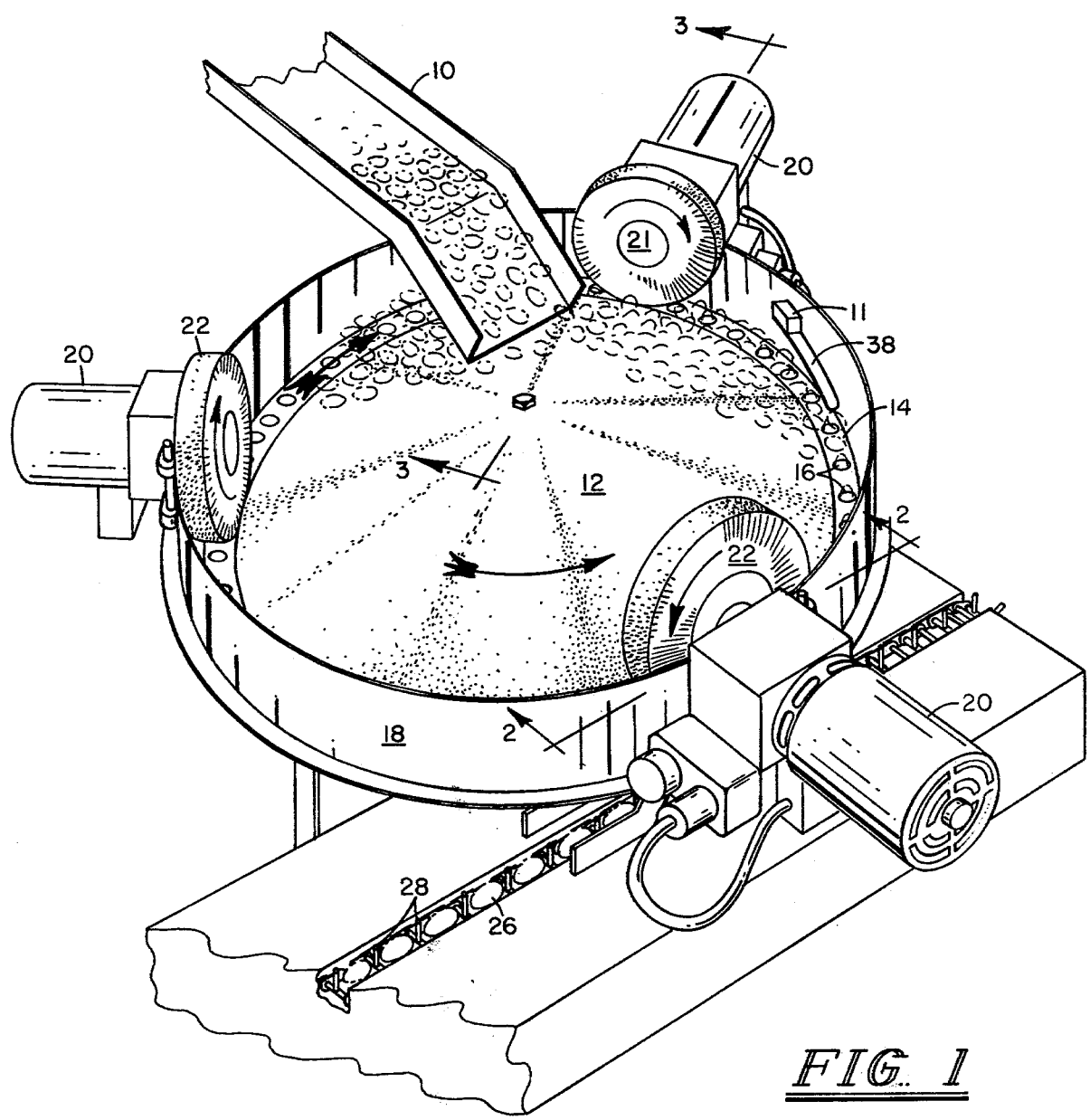
FIG. 1 is a top perspective view of the conveyor feeder combination illustrating principally the cone, and the ring positioned in the cylindrical hopper also illustrating the feed chute, brushes and the chain link conveyor.
Figure 2:
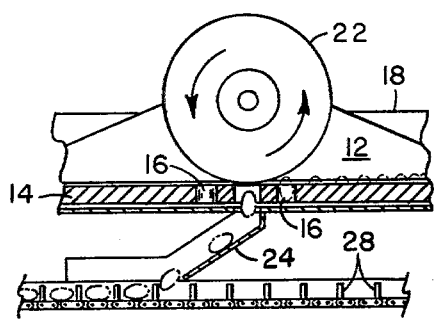
FIG. 2 is a sectional view of FIG. 1 taken substantially on line 2—2 looking in the direction of the arrows.
Figure 3:
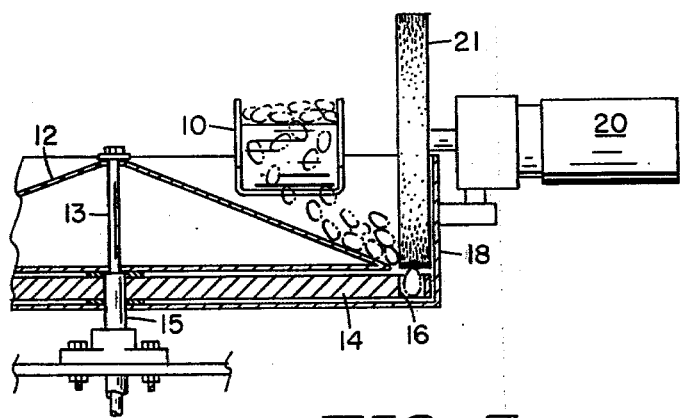
FIG. 3 is a sectional view partially fragmented of FIG. 1 taken substantially on line 3—3 looking in the direction of the arrows, partially fragmented to illustrate a portion of the shaft drive means for rotating the cone and the ring.
Figure 4:
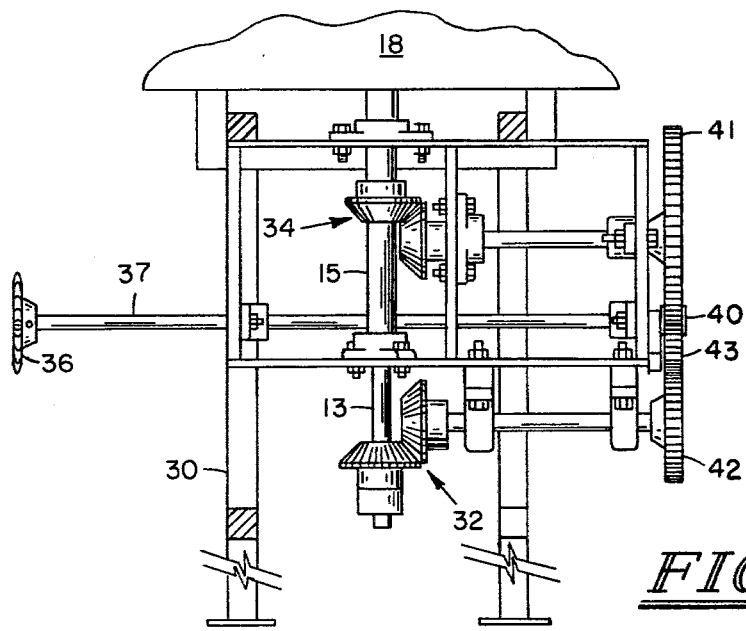
FIG. 4 is a fragmented view illustrating a portion of the shafts and gear drive means for coordinating the rotation of the cone, drive ring and conveyor.
Figure 5:
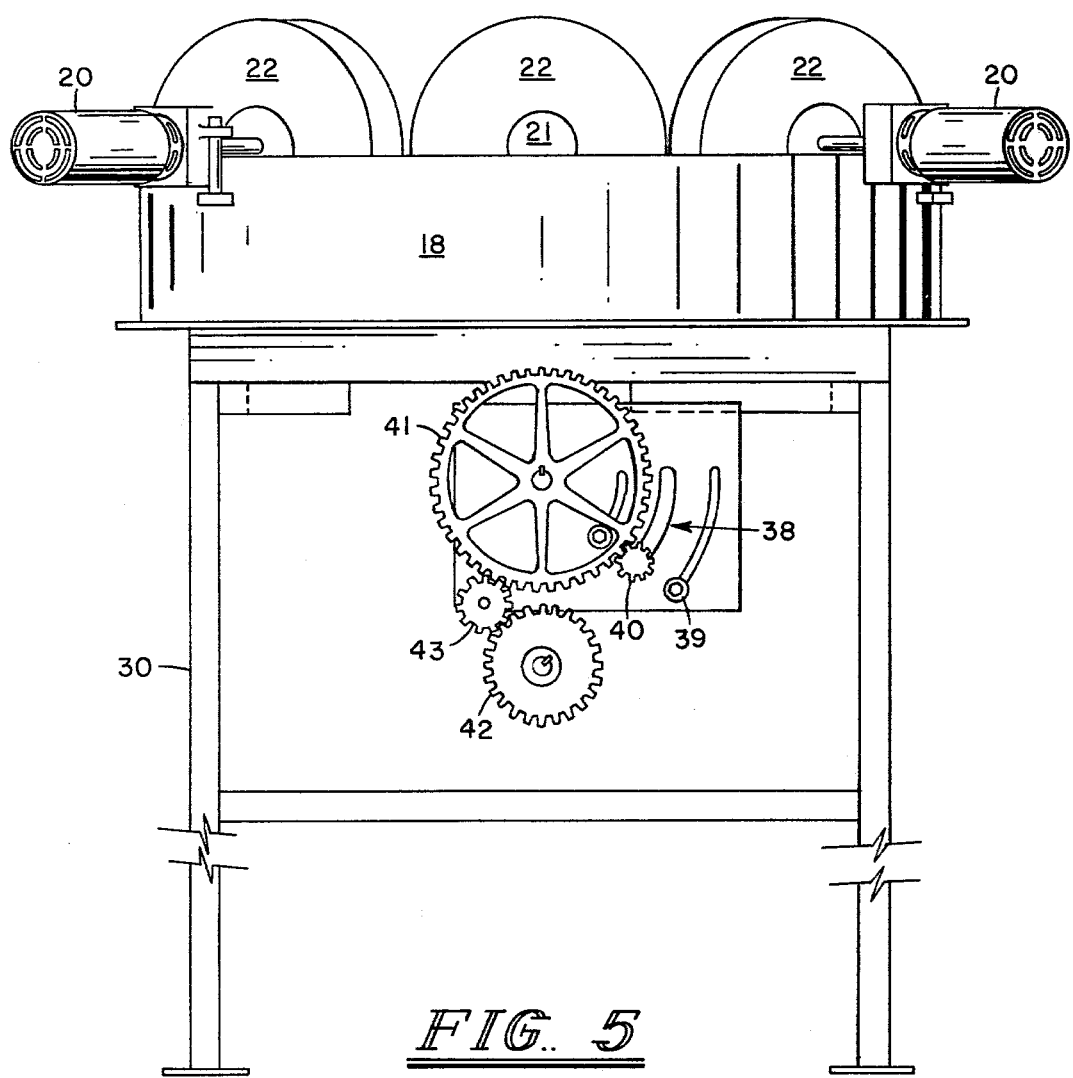
FIG. 5 is a side elevation view of the device principally illustrating the general arrangement and positioning of the major components.

The items to be sorted by the conveyor feeder of this invention are supplied by a feed chute 10 which may be a vibrating type conveyor. To prevent overloading of the device and to control the feed rate, a feed chute switch 11 is positioned in the conveyor feeder and electrically connected to the drive means (not shown) of the feed chute 10. Positioned in the center of the conveyor feeder is a relatively flat cone 12 structure which is rotated in a counterclockwise direction by means of a cone drive shaft 13. Positioned at the lower extremity or periphery of the cone 12 is a ring member 14 which is rotated in a clockwise direction by means of a ring drive shaft 15. Uniformly spaced in ring 14 are a series of ring receptacles 16 which comprise substantially circular holes in the ring 14. The cone 12 and the ring 14 are positioned in and surrounded by a stationary cylindrical hopper 18. This hopper 18 does not rotate; however, cone 12 and ring 14 are free to rotate internal of and adjacent to the stationary cylindrical hopper 18. Secured to and positioned around cylindrical hopper 18 are a series of brush motors 20 having brush shafts 21 which rotate brushes 22 contacting or closely adjacent to ring 14. The purposes for the counter-rotation of the cone 12 and ring 14 in conjunction with brushes 22 is to apply gentle agitation to the candy eggs or other products being sorted by the device to insure proper and consistent positioning of the work product of the machine in the ring receptacle 16 or holes. Positioned directly below the ring 14 is a conveyor chute 24 which receives the candy eggs or items being conveyed or fed by the device and positions the item on the chain link conveyor 26. Compartments are constructed along the chain link conveyor 26 defined by separating pins 28 which project up from the links of the chain link conveyor 26. The components of the device of this invention are mounted on a tubular or angle iron support frame 30 which arrangements and dimensions are determined by the environment in which the machine is employed. The conveyor 26, cone 12 and ring 14 must be coordinated precisely in their rate of rotation or movement. This is accomplished by the shaft and gear drive means as substantially illustrated in FIG. 4. All of these components are mounted in suitable bearing means on support frame 30 and include a cone drive means 32 which comprise beveled drive gears 33 which are connected to and rotate cone drive shaft 13. A somewhat similar arrangement comprises the ring drive means 34 which comprise ring drive gears 35 secured to ring drive shaft 15. Interconnected to and designed to precisely coordinate the movement of chain link conveyor 26 with ring 14 and the holes or ring receptacles 16 is conveyor drive sprocket 36 which is interconnected to the drive mechanism for cone 12 and ring 14 by means of conveyor drive shaft 37. Provisions are made for adjusting the tension of the chain link conveyor 26 with adjusting means 38 of FIG. 5. Switch arm 39 is moved down as illustrated in FIG. 5 to increase tension of chain link conveyor 26, and allow for varying heights and thicknesses of conveying tables. Conveyor drive sprocket 36 engages chain link conveyor 26 on its bottom loop or return loop. The moving of conveyor drive shaft 37 carrying conveyor drive sprocket 36 and shaft gear 40 around ring drive gear 41 accomplishes this adjustment. Ring drive gear 41, cone drive gear 42 and interconnecting idler gear 43 remain in a fixed position during adjustment. The only moving components are switch arm 39, shaft gear 40, conveyor drive sprocket 36, conveyor drive shaft 37 and the companion swing arm (not shown) to the left of FIG. 4.

OPERATION OF THE DEVICE

Candy eggs or other items to be fed or conveyed are provided from a supply source (not shown) onto feed chute 10. This feed chute 10 may be a vibrating feeder. The rate of feed from feed chute 10 is controlled by chute feed switch 11 which is positioned in the stationary cylindrical hopper 18 adjacent ring 14. When the items being fed build up adjacent to cone 12 and ring 14 to a degree in excess of the needs of the device, switch arm 38 is contacted operating chute feed switch 11 deactivating the drive means (not shown) for feed chute 10. In operation of the device the products being sorted fall from feed chute 10 onto cone 12 moving downward over the surface of the slowly rotating cone 12 to ring 14. The candy eggs or other items being conveyed or fed by the device are slightly agitated by the counter-rotation of the cone 12 and ring 14 which, in conjunction with the gental agitation imparted by the rotary brushes 22 insure that the candy eggs or other items being fed are positioned on end in the circular receptacles 16 in ring 14. One brush 22 is located directly over the gravity escape hopper designated as conveyor chute 24 to prevent more than one egg at a time from entering chute 24. As ring 14 rotates in coordination with the movement of chain link conveyor 26, the candy eggs or other items being fed drop by gravity from the receptacles 16 in ring 14 down conveyor chute 24 between the separating pins 28 on the chain link conveyor 26 insuring that each space is properly filled. In the usual assembly line operation, chain link conveyor 26 would feed a wrapper or other suitable packaging machinery (not shown).

Having described the construction and operation of the preferred embodiment, what is desired to be claimed is all embodiments of this invention falling within the scope of equivalents of the inention as defined in the appended claims.

I claim:
1. A conveyor feeder comprising:
   a. control feed means capable of supplying items to said conveyor feeder,
   b. a cone rotating in a first direction mounted in the center of,
   c. a ring rotating in a second direction,
   d. rotating brush means positioned adjacent said rotating ring in such a position as to agitate items being supplied to the said conveyor feeder,
   e. receptacle means spaced on said ring suitable for receiving items being supplied to said conveyor feeder, and
   f. drive means interconnecting said ring and conveyor means for coordinating the rotation of said ring and movement of said conveyor means.
2. The invention of claim 1 wherein said receptacle means comprises substantially circular receptacles spaced in said ring for receiving items being supplied to said conveyor feeder.
3. The invention of claim 1 wherein said conveyor means comprises a chain link conveyor adjacent said rotating ring for receiving items from said rotating ring.
4. The invention of claim 1 wherein said drive means is a gear drive means and wherein said conveyor means is a chain link conveyor.
5. The invention of claim 3 further comprising a conveyor feed chute operably positioned between said rotating ring and said chain link conveyor.
6. The invention of claim 3 further comprising consistently spaced pins secured along said chain link conveyor forming compartments along said chain link conveyor.
7. The invention of claim 1 further comprising a chute feed switch positioned adjacent said ring, said switch adapted to be actuated responsive to a build-up of items on said ring.
8. The invention of claim 1 wherein said items being supplied are oblong and said receptacle means being constructed to stand said items on end.

* * * * *